United States Patent Office 2,994,715
Patented Aug. 1, 1961

2,994,715
PREPARATION OF METHYLOXYFLUORO-PHOSPHINE
Herman S. Bloch, Chicago, Ill., assignor, by mesne assignments, to Universal Oil Products Company, Chicago, Ill., a corporation of Delaware
No Drawing. Filed July 14, 1949, Ser. No. 104,813
4 Claims. (Cl. 260—543)

This invention relates to a process for producing intermediate organic compounds and particularly to methods of producing an intermediate in the production of military toxicants.

An object of this invention is to produce methyloxyfluorophosphine.

One specific embodiment of this invention relates to a process for producing methyloxyfluorophosphine which comprises reacting hydrogen fluoride with a member of the group consisting of the monomethyl ester of methyl phosphonic acid and its pyro compound, that is, dimethyl pyrophosphonic acid.

In accordance with the process of this invention, the above mentioned ester (or its pyro compound) is reacted directly with hydrogen fluoride to produce the desired difluoro compound. This process is illustrated further by the following equations:

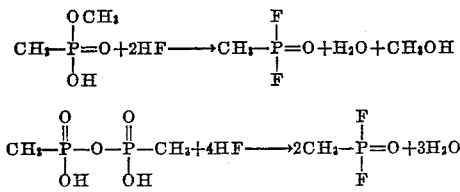

The above indicated reactions are carried out in the presence of an excess of hydrogen fluoride in order that this excess hydrogen fluoride may combine with the water liberated in the reaction. The hydrogen fluoride so employed contains not more than about 10% by weight of water and is generally used in the form of substantially anhydrous hydrogen fluoride as this is preferred for removing the water produced in the reaction. The reaction is carried out at a temperature of from about 100° to about 200° C. and under a superatmospheric pressure of from about 3 to about 25 atmospheres. In order to eliminate or minimize corrosion, it is desirable to employ silver-lined, Monel-lined or copper-lined reaction vessels rather than iron vessels.

The products formed in these reactions with hydrogen fluoride may be separated from the aqueous concentrates of hydrogen fluoride by distillation or by extraction with an inert solvent such as for example benzene.

The following example illustrates the results obtainable in this process although it should not be misconstrued to limit unduly the generally broad scope of the invention.

110 grams of monomethyl ester of methylphosphonic acid and 400 grams of substantially anhydrous hydrogen fluoride are reacted at a temperature of 110° C. and at a pressure of approximately 7 atmospheres in a silver-lined steel autoclave for a time of 2 hours. The resultant reaction mixture is separated from the aqueous hydrogen fluoride and the recovered organic material is subjected to fractional distillation to separate methyloxyfluorophosphine from methanol and by-products of the reaction. The yield is approximately 60% of the theoretical. A somewhat lesser yield of methyloxyfluorophosphine is obtained under the same conditions from anhydrous hydrogen fluoride and dimethylpyrophosphonic acid, according to the reaction of Equation 2.

I claim as my invention:
1. A process for producing methyloxyfluorophosphine which comprises reacting hydrogen fluoride with a compound selected from the group consisting of the monomethyl ester of methylphosphonic acid and dimethylpyrophosphonic acid at a temperature of from about 100° to about 200° C. and a pressure of from about 3 to about 25 atmospheres, and recovering methyloxyfluorophosphine from the resultant reaction product.

2. A process for producing methyloxyfluorophosphine which comprises reacting hydrogen fluoride containing not more than 10% by weight of water with the monomethyl ester of methylphosphonic acid at a temperature of from about 100° to about 200° C. and at a pressure of from about 3 to about 25 atmospheres, separating the resultant reaction product and recovering said methyloxyfluorophosphine therefrom.

3. A process for producing methyloxyfluorophosphine which comprises reacting hydrogen fluoride containing not more than 10% by weight of water with the monomethyl ester of methylphosphonic acid at a temperature of from about 100° to about 200° C. and at a pressure of from about 3 to about 25 atmospheres, extracting the resultant reaction product with a substantially inert organic solvent, and recovering said methyloxyfluorophosphine from the solution in said organic solvent.

4. A process for producing methyloxyfluorophosphine which comprises reacting hydrogen fluoride containing not more than 10% by weight of water with the monomethyl ester of methylphosphonic acid at a temperature of from about 100° to about 200° C. and at a pressure of from about 3 to about 25 atmospheres, and subjecting the resultant reaction mixture to fractional distillation to separate said methyloxyfluorophosphine therefrom.

References Cited in the file of this patent
UNITED STATES PATENTS

| | | |
|---|---|---|
| 2,146,356 | Schrader | Feb. 7, 1939 |
| 2,409,039 | Hardy | Oct. 8, 1946 |
| 2,475,966 | Hull | July 12, 1949 |

FOREIGN PATENTS

| | | |
|---|---|---|
| 591,383 | Great Britain | Aug. 15, 1947 |
| 807,769 | France | Jan. 21, 1934 |

OTHER REFERENCES
Chem. Trade Journal and Chem. Eng., vol. 106 (Feb. 23, 1940), page 113.